UNITED STATES PATENT OFFICE.

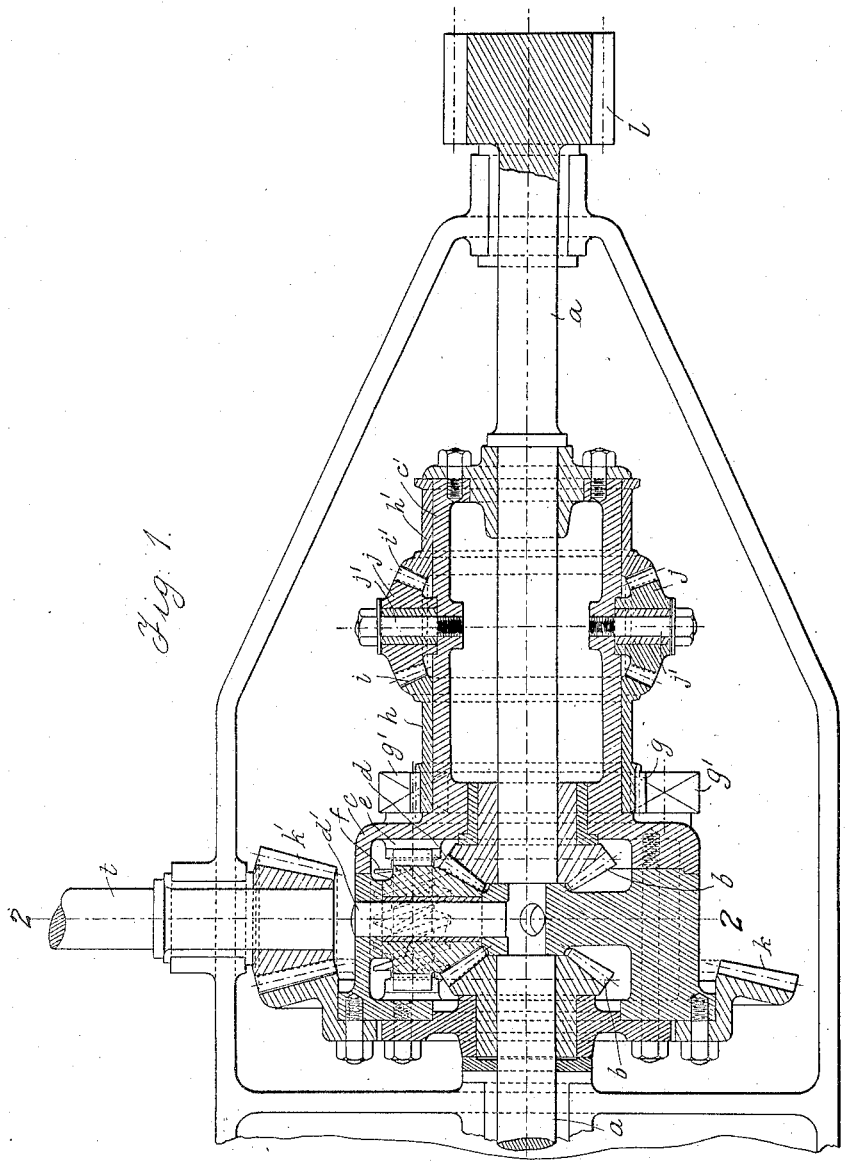

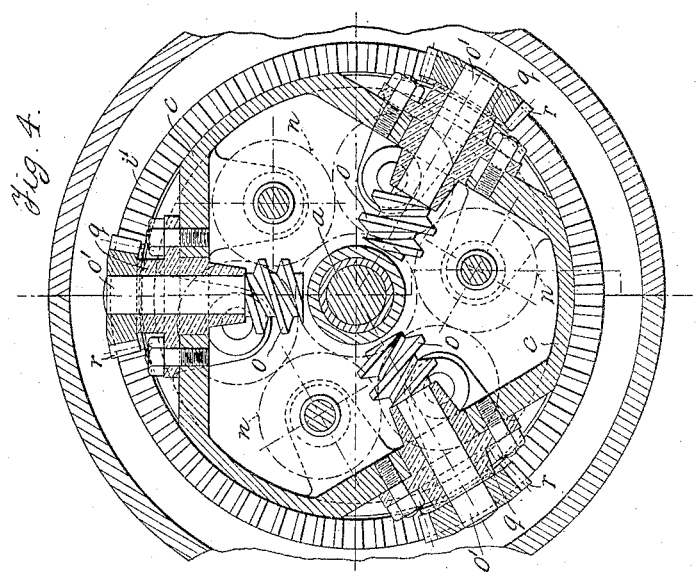
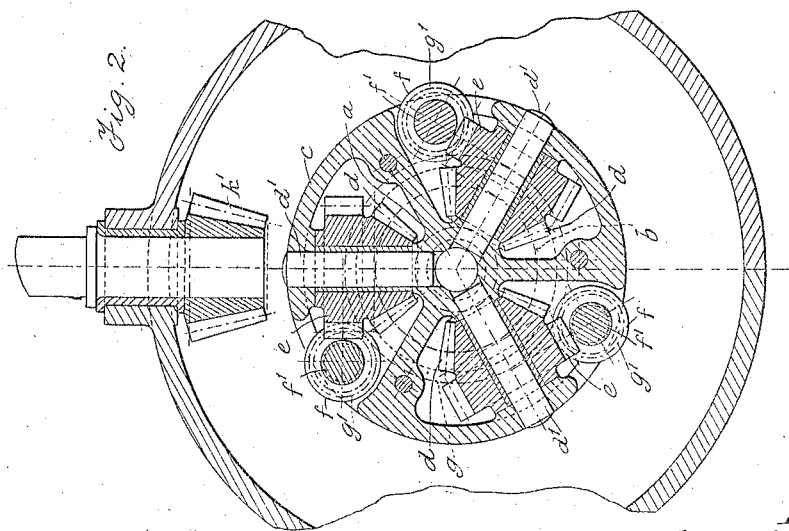

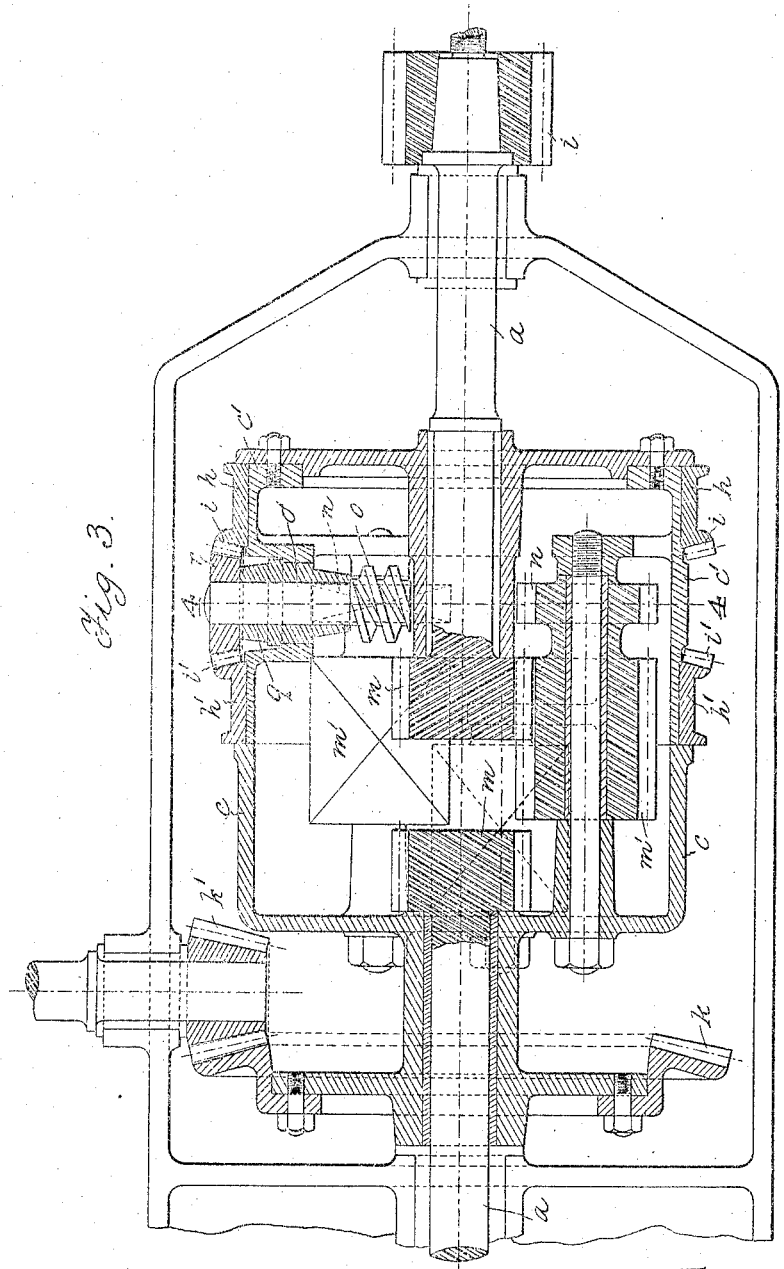

FRANK CARTER, EVERSHED CARTER, AND RICHARD EDWARD WATTS, OF STAMFORD, ENGLAND, ASSIGNORS OF ONE-FOURTH TO GEORGE MILLS BLACKSTONE, OF STAMFORD, ENGLAND.

DIFFERENTIAL STEERING-GEAR FOR MOTOR-VEHICLES.

1,300,118.  Specification of Letters Patent.  Patented Apr. 8, 1919.

Application filed November 20, 1918. Serial No. 263,333.

*To all whom it may concern:*

Be it known that we, FRANK CARTER, EVERSHED CARTER, and RICHARD EDWARD WATTS, all subjects of the King of Great Britain, and residents of Stamford, in the county of Lincoln, England, have invented a new and useful Improvement in Differential Steering-Gear for Motor-Vehicles, of which the following is a specification.

This invention relates to steering mechanism of motor vehicles especially applicable to a self-laying track motor vehicle in which the whole of the weight of the vehicle is carried upon the tracks, and in which a differential balance gear is included in the countershaft that actuates the driving wheels of the vehicle.

The object of our invention is to provide a simple and efficient irreversible gear, by means of which the driving or track-laying wheels are locked together, when the vehicle is required to go straight as is the case, for example, with a tractor drawing a plow, and which can be definitely controlled, when required, for altering the course.

According to our invention we fix to each of the bevel pinions or planet pinions of the differential balance gear of the usual type included in the driving countershaft of the vehicle a worm wheel with which engages a worm having its axis parallel to the axis of the gear.

These worms and wheels are cut at such an angle as to preclude the possibility of the wheels driving the worms, friction being taken into account, and consequently the two parts of the driving countershaft are by this means locked together and must revolve in unison, so that the vehicle is maintained on a straight course.

When it is desired to alter the course of the vehicle either to the right or left the worms are rotated in the proper direction by means of spur gearing controlled by two brake drums or equivalent means, one drum being connected directly to the controlling spur wheel and the other being connected thereto through reversing gear.

Our invention can also be applied to a spur differential gear by employing brake-controlled bevel gears, the planet pinions of which are connected to worms engaging worm wheels fixed to the differential pinions.

The accompanying drawings illustrate the invention.

Figure 1 is a central longitudinal section of a bevel gear differential to which out invention is applied.

Fig. 2 is a section on line 2—2, Fig. 1.

Fig. 3 is a central longitudinal section showing our invention applied to a spur gear differential.

Fig. 4 is a section on line 4—4, Fig. 3.

Referring to Figs. 1 and 2:

$a, a$ are the parts of a divided countershaft, and $b, b$ are bevel wheels fixed thereto and forming part of the balance differential gear. The outer ends of the two parts of the countershaft carry driving pinions which engage the driving or track-laying wheels of the vehicle. One of these pinions is shown at $l$.

$c$ is the revolving differential case carrying pins $d', d', d'$, on which are mounted the bevel planet pinions $d, d, d$, which complete the differential gear. Integral with or fixed to the bevel pinions $d, d, d$ are worm wheels $e, e, e$, which are engaged by worms $f, f, f$ tight on the spindles $f', f', f'$ carried by the case $c$, and to which spindles are also secured the spur pinions $g', g', g'$.

$g$ is a central controlling spur wheel in mesh with the pinions $g', g', g'$. To the gear wheel $g$ is attached a brake drum $h$, which carries a bevel wheel $i$. $h'$ is a second brake drum carrying a bevel wheel $i''$, which gears with the wheel $i$ through bevel pinions $j, j$ which are mounted on pins $j', j'$ carried on the extension $c'$ of the differential case $c$. The brake drums $h, h'$ and spur wheel $g$ are mounted freely on the extension $c'$.

$k, k'$ are bevel driving gears by which the countershaft $a$ is driven from the main driving shaft $t$. The wheel $k$ is fixed to the case $c$.

It will be understood that when the vehicle is on a straight course, the two parts of the countershaft $a$, the differential, and the case $c$ together with the brake drums $h, h'$ and spur wheel $g$ all rotate together as a solid mass with the wheel $k$. If now a brake is applied to the drum $h$ to reduce its speed or to stop it entirely, the worms $f, f, f$ will thereby be caused to rotate thus revolving the bevel pinions $d, d, d$ and producing a differential or relative rotation of the two parts *a* of the countershaft which will have the effect of changing the course of the vehicle. A similar result, but in the contrary direction, will be produced by applying a brake to the drum *h'*.

In the modification shown in Figs. 3 and 4, *m*, *m* are the differential wheels fixed to the inner ends of the divided countershaft *a* and *m'*, *m'*, *m'* are the epicyclic or planet pinions.

*n*, *n*, *n* are worm wheels fixed to the pinions *m'*, *m'*, *m'*, and *o*, *o*, *o* are the worms engaging with the worm wheels *n*, *n*, *n*, said worms being fast on spindles *o'*, *o'*, *o'*, carried in bearings *q*, *q*, *q*, mounted in an extension *c'* of the case *c*. Said spindles *o'* have fixed on them the bevel pinions *r*, *r*, *r*. *h*, *h'* are the controlling brake drums which are mounted upon the extension *c'* of the differential case *c*, and which respectively carry bevel toothed rings *i*, *i'* which engage the pinions *r*, *r*, *r*.

What we claim is:—

1. In a differential steering gear for motor vehicles of the kind specified, the combination with the planet pinions of the gear of worm wheels fast to the planet pinions, worms engaging said worm wheels for locking same to maintain the vehicle on a straight course, and means for rotating the worms to change the course of the vehicle.

2. In a differential steering gear for motor vehicles of the kind specified, the combination with the planet pinions of the gear of worm wheels fast to the planet pinions, worms engaging said worm wheels for locking the same to maintain the vehicle on a straight course, and a brake drum geared to said worms and serving when braked to rotate the worms and thus change the course of the vehicle.

3. In a differential steering gear for motor vehicles of the kind specified, the combination with the planet pinions of the gear of worm wheels fast to the planet pinions, worms engaging said worm wheels for locking the same to maintain the vehicle on a straight course, a pair of brake drums geared together and to the worms, and serving to effect the rotation of the worms when braked, for altering the course of the vehicle.

4. In a differential steering gear for motor vehicles of the kind specified, the combination with the planet pinions of the gear of worm wheels fast to the planet pinions, worms engaging said worm wheels for locking the same to maintain the vehicle on a straight course, a pair of brake drums geared to intermediate differential pinions, and one of said brake drums being connected to a spur wheel in gear with pinions fast on the worms, substantially as described.

FRANK CARTER.
EVERSHED CARTER.
RICHARD EDWARD WATTS.

Witnesses:
JOSEPH WILLIAM BELTON,
PERCY AITKEN.

Copies of this patent may be obtained for five cents each, by addressing the "Commissioner of Patents, Washington, D. C."